United States Patent
Fox et al.

(10) Patent No.: US 12,261,531 B2
(45) Date of Patent: Mar. 25, 2025

(54) BUCK-BOOST CONVERTER FOR CONTACTOR DRIVE

(71) Applicant: Hamilton Sundstrand Corporation, Charlotte, NC (US)

(72) Inventors: Brennan Fox, Machesney Park, IL (US); Ronald J. Gadow, Stillman Valley, IL (US); Christopher D. Thornton, St. Charles, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 225 days.

(21) Appl. No.: 18/080,479

(22) Filed: Dec. 13, 2022

(65) Prior Publication Data

US 2024/0195303 A1    Jun. 13, 2024

(51) Int. Cl.
*H02M 3/158* (2006.01)
*H02M 1/32* (2007.01)

(52) U.S. Cl.
CPC ........... *H02M 3/1582* (2013.01); *H02M 1/32* (2013.01)

(58) Field of Classification Search
CPC .............................. H02M 3/1582; H02M 1/32
See application file for complete search history.

(56) References Cited

U.S. PATENT DOCUMENTS

| | | | |
|---|---|---|---|
| 8,299,738 B2 | 10/2012 | Rozman et al. | |
| 9,061,595 B2 | 6/2015 | King et al. | |
| 9,287,418 B2 | 3/2016 | Nirantare et al. | |
| 10,164,522 B2 | 12/2018 | Kashyap et al. | |
| 10,305,287 B2 | 5/2019 | Hoerist et al. | |
| 10,404,167 B2 | 9/2019 | Fox et al. | |
| 10,720,838 B1* | 7/2020 | Harshey | H02M 1/0061 |
| 10,994,623 B2 | 5/2021 | King et al. | |
| 2011/0221412 A1 | 9/2011 | Li et al. | |
| 2014/0239927 A1 | 8/2014 | Nascimento et al. | |
| 2019/0036451 A1* | 1/2019 | Fox | H02M 1/32 |
| 2022/0069715 A1* | 3/2022 | Karri | H02M 1/0003 |
| 2023/0155507 A1* | 5/2023 | Lee | H02J 7/0068 |
| | | | 363/13 |

FOREIGN PATENT DOCUMENTS

EP    3073625 A2    9/2016

OTHER PUBLICATIONS

Supplementary European Search Report dated May 7, 2024 in connection with European Patent Application No. 23215974.9, 7 pages.

* cited by examiner

*Primary Examiner* — Alex Torres-Rivera

(57) ABSTRACT

A voltage driver includes a voltage input. A voltage regulation controller is operatively connected to receive input voltage from the voltage input and includes an on/off input. The voltage regulation controller is configured to control a switching converter in a first mode, a second mode, at least one buck mode, and at least one boost mode. The switching converter is configured to operate as an open pass switch in the first mode, configured to operate as a closed pass switch in the second mode, configured to operate as an overcurrent and overvoltage protection switch in the at least one buck mode, and configured to operate as an undercurrent and undervoltage protection switch in the at least one boost mode.

20 Claims, 4 Drawing Sheets

BUCK-BOOST CONVERTER FOR CONTACTOR DRIVE

BACKGROUND

1. Field

The present disclosure relates to voltage regulators, and more particularly to voltage regulators such as used for contactor drives.

2. Description of Related Art

The typical contactor drive circuit utilizes a pass switch which does not regulate the output voltage or current and may have monitors that will trip the circuit off in undesirable conditions. One of the main areas where this topology falls short is when the input voltage for the contactor drive is insufficient to guarantee contactor operation. Additionally, high voltage may be passed to the contactor, which may exceed its maximum rating.

The conventional techniques have been considered satisfactory for their intended purpose. However, there is an ever present need for improved systems and methods for voltage regulators such as for contactor drives and the like. This disclosure provides a solution for this need.

SUMMARY

A voltage driver includes a voltage input. A voltage regulation controller is operatively connected to receive input voltage from the voltage input and includes an on/off input. The voltage regulation controller is configured to control a switching converter in a first mode, a second mode, at least one buck mode, and at least one boost mode. The switching converter is configured to operate as an open pass switch in the first mode, configured to operate as a closed pass switch in the second mode, configured to operate as an overcurrent and overvoltage protection switch in the at least one buck mode, and configured to operate as an undercurrent and undervoltage protection switch in the at least one boost mode.

The voltage regulation controller can be a switched-mode regulation controller. The switching converter can be configured to supply to a contactor, or any other suitable component, at least a minimum contactor turn on voltage of the contactor even when voltage supplied to the switching converter is below the minimum contactor turn on voltage. The switching converter can be configured as a fully open switch in the first mode and a fully closed switch in the second mode. An overvoltage threshold of the voltage driver in the buck mode can be dependent on a duty cycle of the switching converter in the buck mode, and an undervoltage threshold of the voltage driver in the boost mode can be dependent on a duty cycle of the switching converter in the boost mode.

A controller can be operatively connected to the switching converter via a programmable circuit. The programmable circuit can be configured to receive an instruction from the controller and to output corresponding switching converter control signals to the switching converter. The controller can be configured to output control signals at a first power level, the switching converter can be a switching converter configured to receive control signals at a second power level, the second power level being higher than the first power level, and the voltage driver can further include an isolation module connecting said controller to said programmable circuit such that the controller is isolated from the switching converter. The controller can be configured to set an overvoltage limit at a first level during power on and at a second level, lower than the first level, during continued operations in at least one buck mode. The controller can be configured to set an undervoltage limit at a third level, lower than the second level, for continued operations in at least one boost mode in an undervoltage state.

A discrete output driver control and monitoring circuit includes a microprocessor controller coupled to a communication bus and configured to provide high level control instructions to the communication bus. A programmable circuit is coupled to the communications bus and is configured to convert a high level control instruction received from the communications bus to at least one control signal. A voltage driver is connected to said programmable circuit such that said at least one control signal sets an operational mode of at least one component of the voltage driver.

At least one sensor module can be connected to said voltage driver such that a voltage sensor of said sensor module is configured to sense an output voltage of said voltage driver and a current sensor of said sensor module can be configured to sense an output current of said sensor module. Each of said voltage sensor and said current sensor can be connected to said controller through said communications bus, such that said output voltage and said output current are communicated to said controller through said bus. The communications bus can be one of an I2C bus and a SPI bus.

The voltage driver can include a voltage input and voltage regulation controller as described above. An isolation and decoupling module can connect said controller to said communications bus, wherein the isolation and decoupling module is configured to isolate said communications bus from said controller.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
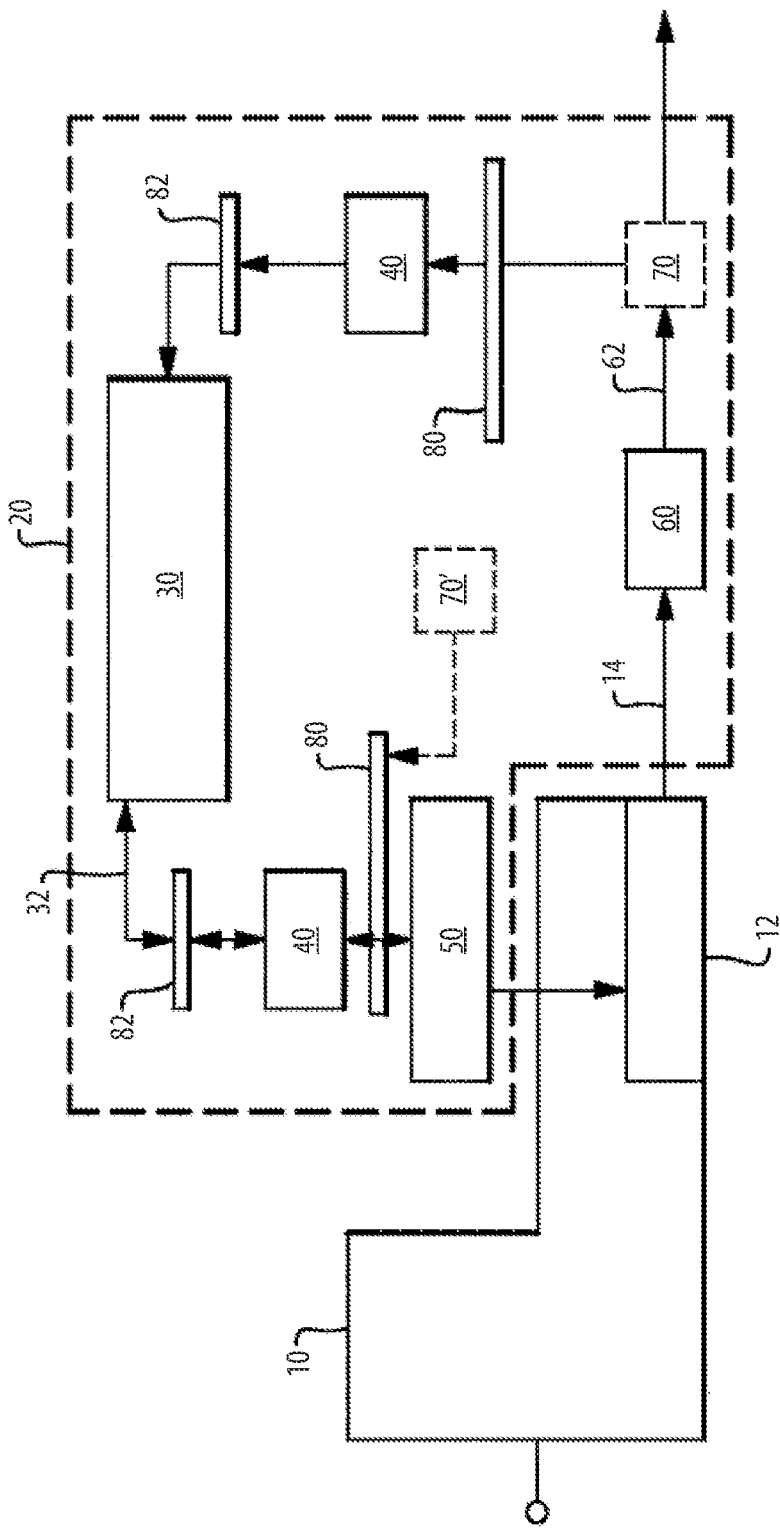
FIG. 1 schematically illustrates a voltage regulation circuit including a control circuit.

Reference will now be made to the drawings wherein like reference numerals identify similar structural features or aspects of the subject disclosure. For purposes of explanation and illustration, and not limitation, a partial view of an embodiment of a voltage driver in accordance with the disclosure is shown in FIG. 1 and is designated generally by reference character 100. Other embodiments of systems in accordance with the disclosure, or aspects thereof, are provided in FIGS. 2, 3A, and 3B, as will be described. The systems and methods described herein can be used to supply power, e.g. to turn on a contactor or the like, over a wider input voltage range than with more conventional techniques.

FIG. 1 schematically illustrates a voltage regulation circuit including a voltage driver 10, and a corresponding discrete output driver control and monitoring circuit 20. Conventional voltage driver circuits utilize a pass through transistor, such as an FET transistor, to control the output of voltage from the voltage driver with the pass transistor allowing a voltage output while in an on mode and preventing a voltage output in an off mode. The conventional pass transistors are also operated in a linear mode to provide a current limiting mode of operations. In place of the conventional pass transistor, the illustrated voltage driver 10 includes a buck-boost converter 12 configured to operate in multiple modes.

A controller 30, within the discrete output driver control and monitoring circuit 20, provides a control output 32 for controlling operations of the buck-boost converter 12. The control output 32 is passed through an isolation and decoupling module 40 to a programmable circuit 50. The controller 30 operates at a low power/voltage level typical of controllers and outputs control instructions at the corresponding power/voltage levels. In contrast, however, the buck-boost converter 12 operates at a high power/voltage level typical of power supply systems. In order to prevent the high power/voltage of the buck-boost converter 12 from damaging, or otherwise impacting, the controller 30, an isolation and decoupling module 40 isolates the output of the controller 30 from direct communication with a communications bus 80. The isolation and decoupling module 40 communicates with the controller 30 through a communications bus 82. In some examples, the isolation and decoupling module 40 has the ability, if applicable, to adjust the voltage level of data going to and coming from the microprocessor controller 30. The communications bus 80, in turn, provides the instruction to the programmable circuit 50. The communications busses 80 and 82 can utilize any standard communications protocol including, but not limited to I2C, SPI, or the like.

Further, control instructions transmitted over the communications bus 80 are not directly compatible with the buck-boost converter 12. The control instructions are high level instructions, and are not control signals capable of causing the buck-boost converter 12 to implement those instructions. The programmable circuit 50 receives the control instructions from the communications bus 80, and converts the control instructions into specific control signals capable of controlling the states and operations of the buck-boost converter 12. While described above as a single direction line of communication to the buck-boost converter 12, one of skill in the art, having the benefit of this disclosure, will understand that the line of communication can, in some examples be bi-directional, allowing the programmable circuit 50 to transmit control information, regarding the buck-boost converter 12, to the controller 30.

An output 14 of the buck-boost converter 12 is passed to a filter module 60. The filtering module 60 can be any type of commercially known filter that is capable of smoothing the voltage output 14 of the buck-boost converter 12. In some examples, the filter module 60 can include two or more distinct filter types. Connected to the output 62 of the filter module 60 is a sensor module 70. The sensor module 70 can include any high power/voltage sensors including a temperature sensor, a current sensor, a voltage sensor, or any number of other known sensor types. The sensed information from the sensor module 70 is provided to the isolation and decoupling module 40, through the bus 80. The isolation and decoupling module 40 converts the high power/voltage sensor information from the sensor module 70 to a low power/voltage input signal. In some examples, the sensor module 70 includes analog to digital conversions for the bus 80. The low power/voltage input signal is then passed to the controller 30. The controller 30, in turn utilizes the sensor readings to generate control instructions for the programmable circuit 50. In some examples, additional sensors 70', such as temperature sensors, can be included in the discrete output driver control and monitoring circuit 20. The additional sensors 70' are connected to the controller 30 through the bus 80.

In one exemplary embodiment, the voltage driver 10 can be included in a Direct Current (DC) Solid State Power Controller (SSPC). In another exemplary embodiment, the voltage driver can be included within a DC Solid State Relay (SSR). In either exemplary embodiment, the buck-boost converter 12 is operated as a pass switch, and the controller 30 is capable of implementing overvoltage/undervoltage prevention and overcurrent/undercurrent prevention features using the buck-boost converter 12.

In conventional SSPC's and SSR's, a pass transistor is operated as the pass switch, and overcurrent control is provided by placing the pass transistor in a linear mode. In the example of FIG. 1, however, the pass transistor is replaced with the buck-boost converter 12. The buck-boost converter 12 is capable of operating at any duty cycle from 0% to 100%, with the specific duty cycle being controlled by the controller 30 using conventional buck converter control techniques. When the controller 30 sets the duty cycle at 0%, the buck-boost converter 12 operates as an open switch and prevents a voltage output from being passed. When the controller 30 sets the duty cycle at 100%, e.g. for a positive voltage buck-boost that operates with two distinct switches M1, M2, e.g. as in FIG. 3B, where one switch is at 100% duty and the other is at 0% duty, such that the input voltage passes to the output, the buck-boost converter 12 operates as a closed switch and allows 100% of the voltage to be passed through the buck-boost converter 12.

During operation of the circuit of FIG. 1, the controller 30 is configured to operate the buck-boost converter 12 in at least one additional mode where the duty cycle is between 0% and 100%. By placing the buck-boost converter 12 into the additional modes, the output voltage and current of the voltage driver 10 is limited dependent upon the duty cycle at which the buck-boost converter 12 is operating, with a higher duty cycle resulting in a higher voltage and current limit.

In some additional examples, when the voltage driver 10 is first enabled, the output voltage 62 is low. The output voltage 62 increases after the voltage driver 10 is first enabled. In such an example, the controller 30 further operates the buck-boost converter 12 in another additional mode. The second additional mode increases the duty cycle of the buck-boost converter 12 above the duty cycle of the first mode. By increasing the duty cycle of the buck-boost converter 12, the output voltage 62 is increased proportionally. In other words, the magnitude of overvoltage/undervoltage protection provided by the buck-boost converter 12 is dependent upon the duty cycle of the buck-boost converter 12.

In yet further examples, multiple additional duty cycle modes can be utilized by the circuit to achieve varying levels of overcurrent and overvoltage control as conditions dictate.

Figure 2:
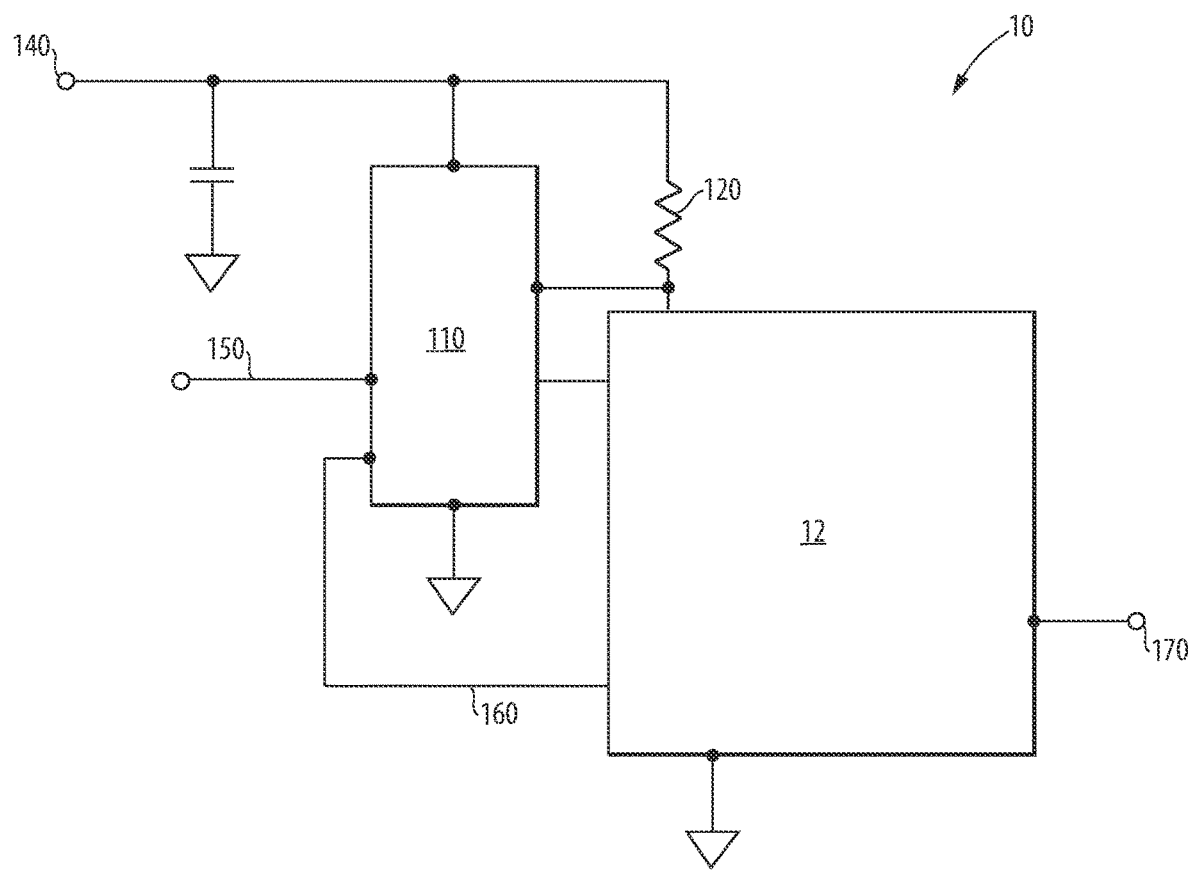
FIG. 2 schematically illustrates an exemplary voltage regulator, as could be used in the voltage regulation circuit of FIG. 1, in greater detail.

With continued regards to FIG. 1, and with like numerals indicating like elements, FIG. 2 illustrates a more detailed schematic view of the voltage driver 10 including the buck-boost converter 12. The voltage driver 10 includes a switching regulation controller 110 with an on/off input 150. The on/off input is connected to a control interface, such as the communications bus 80, and receives control signals for the voltage driver 10 from an external controller.

An input voltage 140 is received from a voltage source, and connected to the switching regulation controller 110, and a current sense resistor 120. The current sense resistor 120 is connected to a standard buck-boost converter 12. The buck-boost converter 12 is controlled by the switching regulation controller 110, according to known control techniques. The current sense resistor provides a current sensing back to the switching regulation controller 110, and allows the switching regulation controller to utilize current based feedback controls. Included within the buck-boost converter 12 is a voltage sensing arrangement that provides a sensed voltage output 160 to the switching regulation controller 110. The buck-boost converter 12 includes a voltage output 170 and is connected to a discrete output driver control and monitoring circuit 20 as illustrated in FIG. 1. While illustrated schematically in FIG. 1 as the programmable circuit 50 directly controlling the buck-boost converter 12, one of skill in the art will appreciate that the programmable circuit 50 can be interfaced with the switching regulation controller 110 and provide indirect control to the buck-boost converter 12. In alternative examples, the switching regulation controller 110 and the programmable circuit 50 can be a single programmable circuit capable of performing both functions.

Figure 3A:
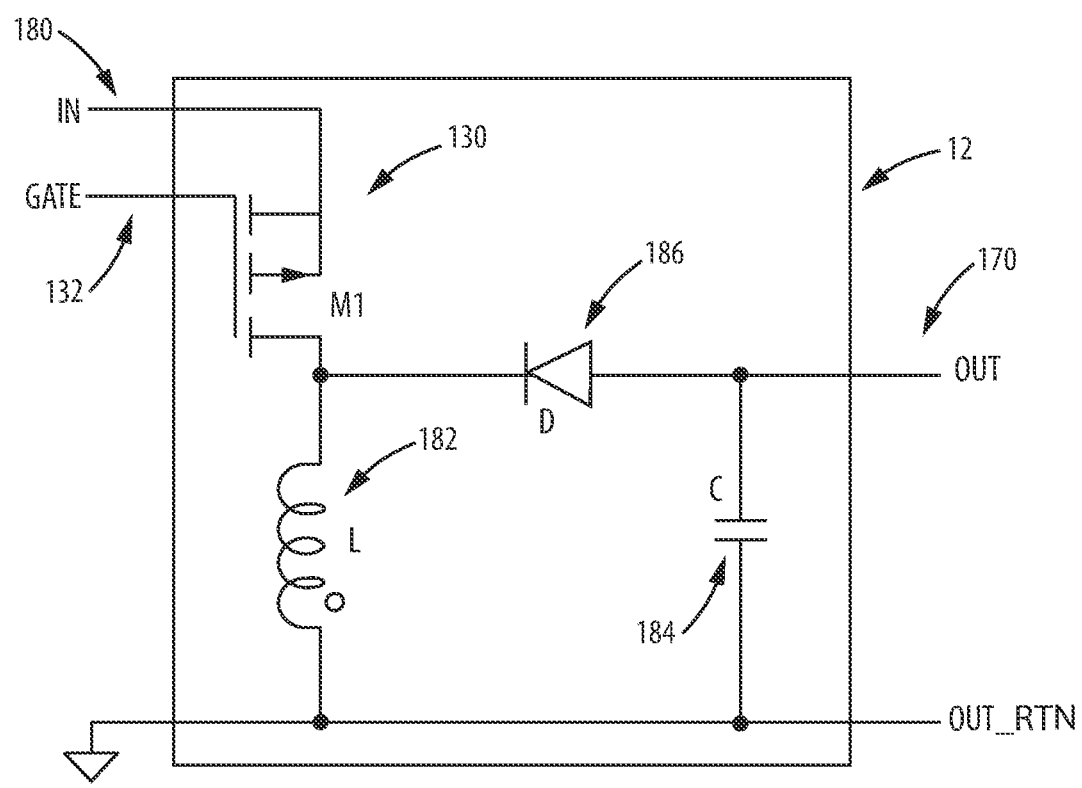
FIG. 3A schematically illustrates an exemplary buck-boost converter for utilization with the voltage regulator of FIG. 2, which can be used if output polarity reversing is permitted.

With continued reference to FIGS. 1 and 2, and with like numerals indicating like elements, FIG. 3A schematically illustrates an exemplary buck-boost converter 12 topology that can be utilized in the illustrated circuits of FIGS. 1 and 2. The buck-boost converter 12 includes a transistor 130 with a control input 132. The control input 132 is connected to the switching regulation controller 110 and controls the duty cycle of the buck-boost converter 12. A voltage input 180 is connected to one end of the transistor 130, and provides a current to an inductor 182, a capacitor 184, and a free-wheeling diode 186.

Figure 3B:
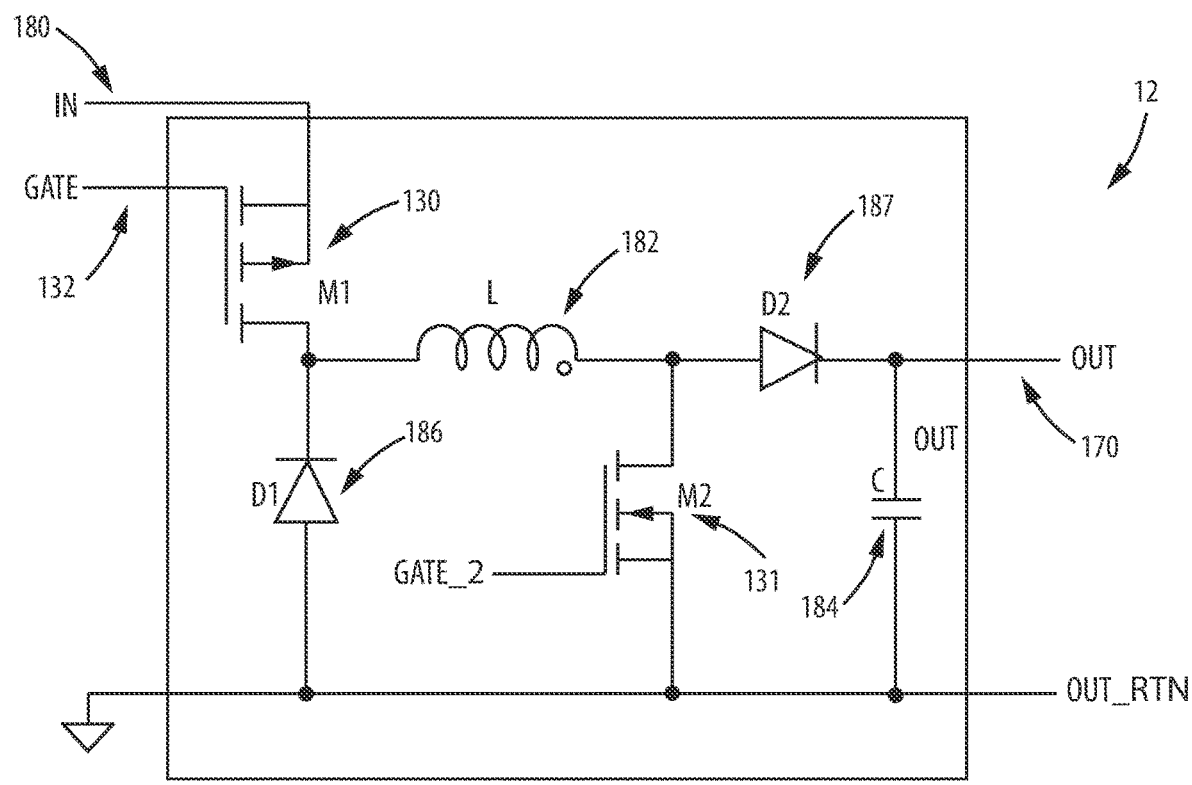
FIG. 3B schematically illustrates an exemplary buck-boost converter for utilization with the voltage regulator of FIG. 2, which can be used if output polarity reversing is not permitted.

The inductor 182, capacitor 184 and free-wheeling diode 186 are arranged as a buck-boost converter 12, and provide a voltage to the voltage output 170. The voltage output 170 is reduced or increased as needed, relative to the voltage input 180 proportional to the duty cycle generated by the switching of the transistor 130. This allows the voltage driver 10 to operate the buck-boost converter 12 in a buck switch mode provide overcurrent/overvoltage protection. It also allows the voltage driver 10 to operate the buck-boost converter 12 in a boost switch mode to provide undervoltage/undercurrent protection, e.g. to provide suitable output voltage/current, e.g. in an emergency where the input voltage/current is below normal operating levels. The topology in FIG. 3A can be used when reversal of polarity in the output voltage is acceptable. In applications where the output polarity reversal is not acceptable, the topology in FIG. 3B can be used. In FIG. 3B, similar numbering is used for similar elements, and the topology in FIG. 3B adds the second transistor 131 and the second diode 187. The second diode 187 connects in series between the inductor 182 and the voltage output 170. The second transistor 131 connects from a node between the inductor 182 and the second diode 187 to the voltage output return (OUT_RTN in FIG. 3B).

The buck-boost converter topology applied as described above can keep the output voltage and current within a desired range, whenever the input power to the driver is outside of the contactor's operating conditions. Due to the multi-stage current profile of an electrically held contactor, for example, the output power parameters can be set to have selectable or programmable limits to mitigate fault propagation. One application for systems and methods as disclosed herein is controlling a contactor, e.g. aboard an aircraft, where the minimum operating voltage supplied to the contactor is below the minimum contactor turn on voltage. The systems and methods as disclosed herein can supply the minimum turn on voltage to such a contactor.

The methods and systems of the present disclosure, as described above and shown in the drawings, provide for power output given a wider input voltage range, e.g. for turning on contactors and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A voltage driver comprising:
   a voltage input; and
   a voltage regulation controller operatively connected to receive input voltage from the voltage input and including an on/off input, the voltage regulation controller configured to control a switching converter in a first mode, a second mode, at least one buck mode, and at least one boost mode;
   wherein the switching converter is configured to operate as an open pass switch in the first mode, configured to operate as a closed pass switch in the second mode, configured to operate as an overcurrent and overvoltage protection switch in the at least one buck mode, and configured to operate as an undercurrent and undervoltage protection switch in the at least one boost mode; and
   wherein the switching converter is configured to supply to a contactor at least a minimum contactor turn on voltage of the contactor even when voltage supplied to the switching converter is below the minimum contactor turn on voltage.

2. The voltage driver of claim 1, wherein the switching converter is configured as a fully open switch in the first mode and a fully closed switch in the second mode.

3. The voltage driver of claim 1, further comprising a controller operatively connected to the switching converter via a programmable circuit, the programmable circuit configured to receive an instruction from the controller and to output corresponding switching converter control signals to the switching converter.

4. The voltage driver of claim 3, wherein:
   the controller is configured to output control signals at a first power level;
   the switching converter is configured to receive control signals at a second power level;
   the second power level is higher than the first power level; and the voltage driver further includes an isolation module connecting the controller to the programmable circuit such that the controller is isolated from the switching converter.

5. The voltage driver of claim 1, wherein the voltage regulation controller is a switched-mode regulation controller.

6. A voltage driver comprising:
a voltage input; and
a voltage regulation controller operatively connected to receive input voltage from the voltage input and including an on/off input, the voltage regulation controller configured to control a switching converter in a first mode, a second mode, at least one buck mode, and at least one boost mode;
wherein the switching converter is configured to operate as an open pass switch in the first mode, configured to operate as a closed pass switch in the second mode, configured to operate as an overcurrent and overvoltage protection switch in the at least one buck mode, and configured to operate as an undercurrent and undervoltage protection switch in the at least one boost mode;
wherein an overvoltage threshold of the voltage driver in the at least one buck mode is dependent on a duty cycle of the switching converter in the at least one buck mode; and
wherein an undervoltage threshold of the voltage driver in the at least one boost mode is dependent on a duty cycle of the switching converter in the at least one boost mode.

7. The voltage driver of claim 6, wherein the switching converter is configured to supply to a contactor at least a minimum contactor turn on voltage of the contactor even when voltage supplied to the switching converter is below the minimum contactor turn on voltage.

8. The voltage driver of claim 7, further comprising a controller operatively connected to the switching converter via a programmable circuit, the programmable circuit configured to receive an instruction from the controller and to output corresponding switching converter control signals to the switching converter;
wherein the controller is configured to set an overvoltage limit at a first level during power on and at a second level, lower than the first level, during continued operations in the at least one buck mode; and
wherein the controller is configured to set an undervoltage limit at a third level, lower than the second level, for continued operations in the at least one boost mode in an undervoltage state.

9. A voltage driver comprising:
a voltage input;
a voltage regulation controller operatively connected to receive input voltage from the voltage input and including an on/off input, the voltage regulation controller configured to control a switching converter in a first mode, a second mode, at least one buck mode, and at least one boost mode; and
a controller operatively connected to the switching converter via a programmable circuit, the programmable circuit configured to receive an instruction from the controller and to output corresponding switching converter control signals to the switching converter;
wherein the switching converter is configured to operate as an open pass switch in the first mode, configured to operate as a closed pass switch in the second mode, configured to operate as an overcurrent and overvoltage protection switch in the at least one buck mode, and configured to operate as an undercurrent and undervoltage protection switch in the at least one boost mode;
wherein the controller is configured to set an overvoltage limit at a first level during power on and at a second level, lower than the first level, during continued operations in the at least one buck mode; and
wherein the controller is configured to set an undervoltage limit at a third level, lower than the second level, for continued operations in the at least one boost mode in an undervoltage state.

10. A discrete output driver control and monitoring circuit comprising:
a microprocessor controller coupled to a communications bus and configured to provide a high level control instruction to the communications bus;
a programmable circuit coupled to the communications bus and configured to convert the high level control instruction received from the communications bus to at least one control signal; and
a voltage driver connected to the programmable circuit such that the at least one control signal sets an operational mode of at least one component of the voltage driver;
wherein the voltage driver comprises:
a voltage input;
a voltage regulation controller operatively connected to receive input voltage from the voltage input and including an on/off input, the voltage regulation controller configured to control a switching converter in a first mode, a second mode, at least one buck mode, and at least one boost mode;
wherein the switching converter is configured to operate as an open pass switch in the first mode, configured to operate as a closed pass switch in the second mode, configured to operate as an overcurrent and overvoltage protection switch in the at least one buck mode, and configured to operate as an undercurrent and undervoltage protection switch in the at least one boost mode; and
wherein the switching converter is configured to supply to a contactor at least a minimum contactor turn on voltage of the contactor even when voltage supplied to the switching converter is below the minimum contactor turn on voltage.

11. The discrete output driver control and monitoring circuit of claim 10, further comprising:
at least one sensor module connected to the voltage driver such that a voltage sensor of the at least one sensor module is configured to sense an output voltage of the voltage driver and a current sensor of the at least one sensor module is configured to sense an output current of the sensor module;
wherein each of the voltage sensor and the current sensor is connected to the microprocessor controller through the communications bus such that measurements of the output voltage and the output current are communicated to the microprocessor controller through the communications bus.

12. The discrete output driver control and monitoring circuit of claim 10, wherein the communications bus is one of an I2C bus and a SPI bus.

13. The discrete output driver control and monitoring circuit of claim 10, wherein the switching converter is configured as a fully open switch in the first mode and a fully closed switch in the second mode.

14. The discrete output driver control and monitoring circuit of claim 13, wherein:
- an overvoltage threshold of the voltage driver in the at least one buck mode is dependent on a duty cycle of the switching converter in the at least one buck mode; and
- an undervoltage threshold of the voltage driver in the at least one boost mode is dependent on a duty cycle of the switching converter in the at least one boost mode.

15. The discrete output driver control and monitoring circuit of claim 14, wherein:
- the microprocessor controller is configured to set an overvoltage limit at a first level during power on and at a second level, lower than the first level, during continued operations in the at least one buck mode; and
- the microprocessor controller is configured to set an undervoltage limit at a third level, lower than the second level, for continued operations in the at least one boost mode in an undervoltage state.

16. The discrete output driver control and monitoring circuit of claim 10, further comprising an isolation and decoupling module connecting the microprocessor controller to the communications bus, wherein the isolation and decoupling module is configured to isolate the communications bus from the microprocessor controller.

17. The discrete output driver control and monitoring circuit of claim 10, wherein the programmable circuit operatively connects the microprocessor controller and the switching converter.

18. The discrete output driver control and monitoring circuit of claim 10, wherein:
- the microprocessor controller is configured to output control signals at a first power level;
- the switching converter is configured to receive control signals at a second power level;
- the second power level is higher than the first power level; and
- the voltage driver further includes an isolation module connecting the microprocessor controller to the programmable circuit such that the microprocessor controller is isolated from the switching converter.

19. The discrete output driver control and monitoring circuit of claim 10, wherein:
- the microprocessor controller is configured to set an overvoltage limit at a first level during power on and at a second level, lower than the first level, during continued operations in the at least one buck mode; and
- the microprocessor controller is configured to set an undervoltage limit at a third level, lower than the second level, for continued operations in the at least one boost mode in an undervoltage state.

20. The discrete output driver control and monitoring circuit of claim 10, wherein the voltage regulation controller is a switched-mode regulation controller.

* * * * *